United States Patent
Ogawa

(10) Patent No.: US 6,886,515 B2
(45) Date of Patent: May 3, 2005

(54) APPARATUS FOR CONTROLLING INTERNAL COMBUSTION ENGINE EQUIPPED WITH VARIABLE VALVE TIMING CONTROL DEVICE

(75) Inventor: Kazumi Ogawa, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/448,111

(22) Filed: May 30, 2003

(65) Prior Publication Data
US 2003/0233990 A1 Dec. 25, 2003

(30) Foreign Application Priority Data
May 30, 2002 (JP) ........................................ 2002-158134

(51) Int. Cl.$^7$ .............................................. F02D 41/06
(52) U.S. Cl. .................................................. 123/179.18
(58) Field of Search ......................... 123/179.18, 90.15, 123/339.19

(56) References Cited

U.S. PATENT DOCUMENTS

2002/0043243 A1 * 4/2002 Majima ...................... 123/399

FOREIGN PATENT DOCUMENTS

JP 58-41236 A * 3/1983 ............. F02D/9/02

* cited by examiner

Primary Examiner—Andrew M. Dolinar
(74) Attorney, Agent, or Firm—Reed Smith LLP; Stanley P. Fisher, Esq.; Juan Carlos A. Marquez, Esq.

(57) ABSTRACT

An apparatus for controlling an internal combustion engine equipped with a variable valve timing control device includes the variable valve timing control device for restricting a relative rotation between a crankshaft and an exhaust camshaft at a starting of the internal combustion engine at a most advanced angle phase or at an intermediate angle phase between the most advanced angle phase and a most retarded angle phase. An apparatus for controlling an internal combustion engine equipped with a variable valve timing control device further includes a throttle valve control means for controlling an opening of the throttle valve provided at an intake passage of the internal combustion engine. The throttle valve control means controls the throttle valve to be opened when the internal combustion engine is started, thereby to restrict the relative rotation between the crankshaft and the exhaust camshaft.

5 Claims, 2 Drawing Sheets

APPARATUS FOR CONTROLLING INTERNAL COMBUSTION ENGINE EQUIPPED WITH VARIABLE VALVE TIMING CONTROL DEVICE

This application is based on and claims priority under 35 U.S.C. § 119 with respect to Japanese Application No. 2002-158134 filed on May 30, 2002, the entire content of which is incorporated herein by reference.

FIELD OF THE INVENTION

This invention generally relates to an apparatus for controlling an internal combustion engine equipped with a variable valve timing control device.

BACKGROUND OF THE INVENTION

A known variable valve timing control device for an internal combustion engine is disclosed in Japanese Patent Laid-Open Publication No. 11-294121. The disclosed variable valve timing control device is provided in the drive train that transmits a drive force from a crankshaft of the internal combustion engine to a camshaft for opening and closing an exhaust valve of the combustion engine. The known variable valve timing control device includes a housing member rotating with the crankshaft and a vane member rotating with the camshaft and accommodated in a receiving space formed within the housing member so as to rotate relative to the housing member within a predetermined angle. The variable valve timing control device further includes a switching valve for controlling an operation oil supply to an advanced angle chamber defined in the receiving space by the vane member and which volume becomes larger as the vane portion is rotated in an advanced angle direction relative to the housing member by virtue of the supply of the operation oil, and a retarded angle chamber defined in the receiving space by the vane member and which volume becomes larger as the vane member is rotated in a retarded angle direction relative to the housing member by virtue of the supply of the operation oil. Furthermore, the variable valve timing control device includes an oil pump for generating the operation oil, and a torsion spring for biasing the vane member to the advanced angle side (i.e., the direction that enlarges the advanced angle chamber) relative to the housing member. The biasing force of the torsion spring is set higher than or equal to an average torque of the camshaft at idling of the combustion engine under a high oil temperature for ensuring restarting performance of the engine.

According to the above-mentioned variable valve timing control device, if the engine is stopped irregularly under a low oil temperature, the biasing force of the torsion spring may become under the average torque of the camshaft due to a high viscosity of the operation oil. The engine cannot be sopped under the condition that the vane member is surely retained to the most advanced angle side. After the variable valve timing control device is stopped at any positions other than a most advanced angle phase (i.e., a phase of the camshaft is most advanced relative to the crank shaft) or an initial position, i.e. an intermediate angle phase positioned between the most advanced angle phase and a most retarded angle phase (i.e., the phase of the camshaft is most retarded relative to the crank shaft), a valve overlap period during which the exhaust valve and an intake valve are open at the same time is set longer when a sufficient oil is not generated by cranking rotations of the combustion engine for operating the variable valve timing control device for the exhaust valve at restarting of the combustion engine. Therefore, in the intake process, the exhaust gas inflows from the exhaust side and thus a new air-fuel mixture cannot inflows from the intake side. A stable ignition of the internal combustion engine is impossible, thereby enabling to start the internal combustion engine.

Thus, a need exists for an apparatus for controlling internal combustion engine equipped with a variable valve timing control device which can start the internal combustion engine even if the variable valve timing control device is stopped at a position other than the most advanced angle phase or the Intermediate angle phase.

SUMMARY OF THE INVENTION

According to an aspect of the present invention, an apparatus for controlling an internal combustion engine equipped with a variable valve timing control device includes the variable valve timing control device provided in a drive train that transmits a drive force from a crankshaft of the internal combustion engine to an exhaust camshaft of the internal combustion engine so as to restrict or allow a relative rotation between the crankshaft and the exhaust camshaft. The variable valve timing control device controls an opening and a closing timing of an exhaust valve by restricting the relative rotation between the crankshaft and the exhaust camshaft at a starting of the internal combustion engine at a most advanced angle phase where a phase of the camshaft is most advanced relative to the crankshaft or at an intermediate angle phase between the most advanced angle phase and a most retarded angle phase where the phase of the camshaft is most retarded relative to the crankshaft, and by allowing the relative rotation between the crankshaft and the exhaust camshaft. An apparatus for controlling a variable valve timing of an internal combustion engine further includes a throttle valve control means for controlling an opening of the throttle valve provided at an intake passage of the internal combustion engine. The throttle valve control means controls the throttle valve to be opened when the internal combustion engine is started thereby to restrict the relative rotation between the crankshaft and the exhaust camshaft.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
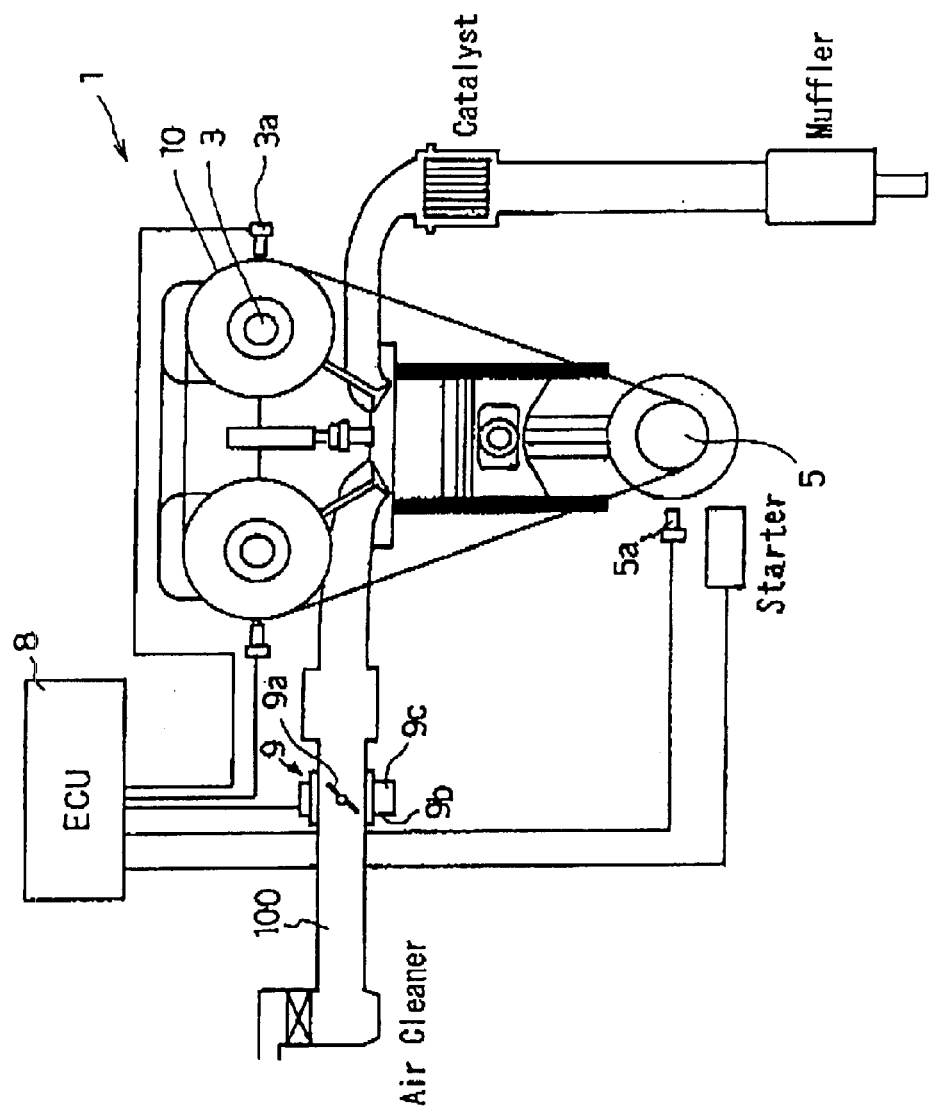
FIG. 1 is a schematic view of a variable valve timing control device employed in an internal combustion engine for a vehicle according to an embodiment of the present invention.

An embodiment of the present invention is explained referring to attached drawings. FIG. 1 is a schematic view of the present invention employed in an internal combustion engine (herein after referred to as engine) 1 installed in a vehicle. An apparatus for controlling an internal combustion engine equipped with a variable valve timing control device of the present invention includes the variable valve timing control device 10, a cam angle sensor 3a for detecting the rotational phase angle of an exhaust camshaft 3 for opening and closing an exhaust valve (not shown), and a crank angle sensor (engine speed sensor) 5a for detecting the rotational phase angle of a crankshaft 5. The control device also includes an electronic control throttle 9 having a throttle valve 9a provided at an intake passage 100 for controlling an intake air flow, a throttle sensor 9b for detecting the opening of the throttle valve 9a and a throttle motor 9c for operating the throttle valve 9a. The control device further includes an electronic control unit (ECU) 8 for controlling the electronic control throttle 9 and the like.

The ECU 8 calculates an actual valve timing of the exhaust valve by signals from the crank angle sensor 5a and the cam angle sensor 3a. In addition, the ECU 8 controls the actual valve timing so that the exhaust valve can be opened or closed at an appropriate timing being preset in the ECU 8 and sets an appropriate valve timing in accordance with the engine driving condition. Further, the ECU 8 controls the opening of the throttle valve 9a in response to the engine speed calculated by a signal from the crank angle sensor 5a, a signal from a timer installed in the ECU 8, and a signal from the throttle sensor 9b. That is, the ECU performs the operation at the engine start.

An operation of the embodiment is explained as follows.

Figure 2:
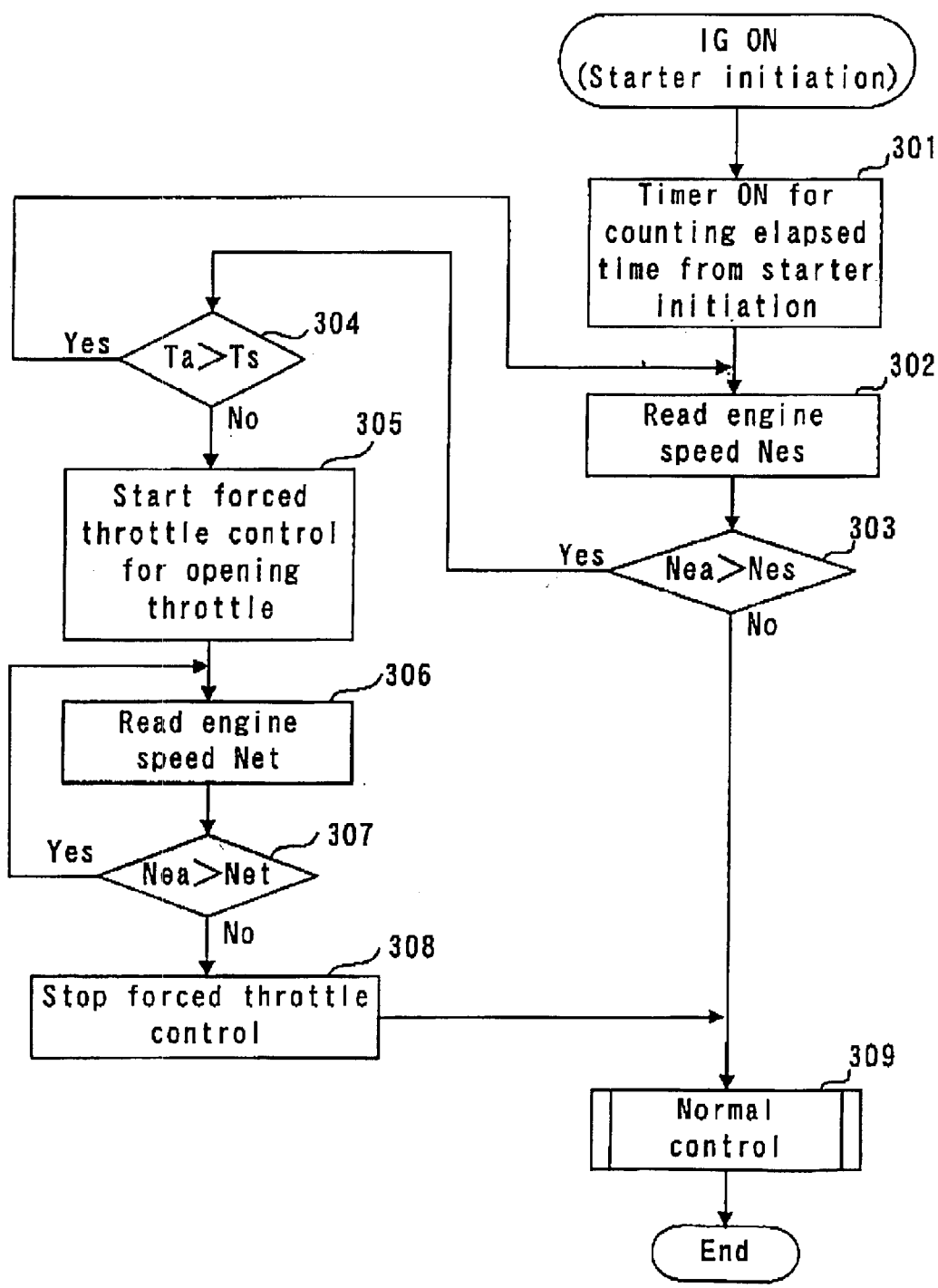
FIG. 2 is a flowchart explaining a starting operation of the internal combustion engine according to the embodiment of the present invention.

The operation routine of the embodiment at the engine start is explained referring to a flowchart in FIG. 2. The operation is carded out by the ECU 8 repeatedly at predetermined time intervals. At Step 301, a timer installed in the ECU 8 is turned on for counting an elapsed time from the initiation of a starter triggered by an ignition (IG) turned on. Next at Step 302, an engine speed Nes is read by the crank angle sensor 5a. Then, at Step 303, it is determined whether the engine speed Nes exceeds a predetermined idle speed Nea. When the engine speed Nes exceeds the predetermined idle speed Nea, the operation proceeds to Step 309 at which a normal control for setting an appropriate valve timing is performed depending on the engine driving condition. When the engine speed Nes is below the predetermined idle speed Nea, the operation proceeds to Step 304. At Step 304, it is determined whether a total starter operation time Ts is longer than a throttle control start set time Ta. When the total starter operation time Ts is shorter than the throttle control start set time Ta, the operation returns to Step 302. When the total starter operation time Ts is longer than the throttle control start set time Ta, the operation proceeds to Step 305 at which a forced throttle control is initiated by the ECU 8 to open the throttle valve 9a. At this time, a new air-fuel mixture can flow in the engine 1 and thus the combustion state of the engine can be stabilized, thereby enabling the engine start. Next, the operation proceeds to Step 306 at which an engine speed Net is read by the crank angle sensor 5a. Then, at Step 307, it is determined whether the engine speed Net exceeds the predetermined idle speed Nea. When the engine speed Net is below the predetermined idle speed Nea, the operation returns to Step 306. When the engine speed Net exceeds the predetermined idle speed Nea, the operation proceeds to Step 308 at which the forced throttle control is stopped. At this time, the engine 1 is in a normal driving condition and thus the operation proceeds to Step 309 at which the normal control is performed for setting the appropriate valve timing depending on the engine driving state.

According to the above-mentioned embodiment, since the throttle valve is opened even if the valve overlap period during which the exhaust valve and the intake valve are open at the same time is longer at the engine restarting, the new air-fuel mixture can flow into the engine, thereby enabling the engine start.

In addition, according to the above-mentioned embodiment, a stable engine start is available since a predetermined throttle opening is set.

Further, according to the above-mentioned embodiment, an over speed of the engine at starting can be prevented, thereby protecting the engine.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An apparatus for controlling an internal combustion engine equipped with a variable valve timing control device, the variable valve timing control device being provided in a drive train that transmits a drive force from a crankshaft to an exhaust camshaft of the engine so as to control a relative rotation between the crankshaft and the exhaust camshaft comprising:
   a timer for counting an elapsed time from the start of an engine starter of the engine;
   an engine speed detection means for detecting the engine speed of the engine; and
   a throttle valve control means for forcibly opening the throttle valve as long as the engine speed of the internal combustion engine is below a predetermined idle speed after the elapse over a predetermined time while valve timing is maintained at a starting relative rotation condition between the crank shaft and the exhaust cam shaft.

2. An apparatus for controlling an internal combustion engine equipped with a variable valve timing control device according to claim 1, wherein the opening of the throttle valve is controlled so that a sufficient air-fuel mixture flows into the internal combustion engine for starting.

3. An apparatus for controlling an internal combustion engine equipped with a variable valve timing control device according to claim 1, wherein the throttle valve control means includes an electronic control throttle mechanism having the throttle valve, a throttle sensor for detecting the opening of the throttle valve, and a throttle motor for operating the throttle valve.

4. An apparatus for controlling an internal combustion engine equipped with a variable valve timing control device according to claim 1, wherein the engine speed detection means includes a crank angle sensor.

5. An apparatus for controlling an internal combustion engine equipped with a variable valve timing control device according to claim 1, wherein the throttle valve control means includes an electronic control unit that controls the opening of the throttle valve based on the engine speed calculated by a signal from the crank angle sensor, a signal from the timer installed in the electronic control unit, and a signal from the throttle sensor.

* * * * *